(12) United States Patent
Yamashita et al.

(10) Patent No.: US 12,187,832 B2
(45) Date of Patent: Jan. 7, 2025

(54) GRAFT COPOLYMER, RESIN COMPOSITION FOR PLATING, MOLDED ARTICLE, AND PLATED PRODUCT

(71) Applicant: Techno-UMG Co., Ltd., Tokyo (JP)

(72) Inventors: Shinji Yamashita, Tokyo (JP);
Hideichiro Kawaguchi, Tokyo (JP);
Hideaki Bekku, Tokyo (JP); Masataka Iwasaki, Tokyo (JP)

(73) Assignee: TECHNO-UMG CO., LTD., Tokyo (JP)

( * ) Notice: Subject to any disclaimer, the term of this patent is extended or adjusted under 35 U.S.C. 154(b) by 0 days.

(21) Appl. No.: 18/710,455

(22) PCT Filed: Sep. 15, 2023

(86) PCT No.: PCT/JP2023/033764
§ 371 (c)(1),
(2) Date: May 15, 2024

(87) PCT Pub. No.: WO2024/090067
PCT Pub. Date: May 2, 2024

(65) Prior Publication Data
US 2024/0327560 A1    Oct. 3, 2024

(30) Foreign Application Priority Data

Oct. 24, 2022  (JP) ................. 2022-169960

(51) Int. Cl.
*C08F 279/04*     (2006.01)
(52) U.S. Cl.
CPC ............... *C08F 279/04* (2013.01)
(58) Field of Classification Search
CPC .................................... C08F 279/04
See application file for complete search history.

(56) References Cited

U.S. PATENT DOCUMENTS

| | | | |
|---|---|---|---|
| 4,612,253 A | * | 9/1986 | Maeda ............ C08K 5/17 428/521 |
| 4,665,125 A | | 5/1987 | Kishida et al. |
| 4,755,559 A | | 7/1988 | Kishida et al. |
| 2010/0004394 A1 | | 1/2010 | Higaki et al. |
| 2017/0044355 A1 | | 2/2017 | Eisentraeger et al. |

FOREIGN PATENT DOCUMENTS

| | | |
|---|---|---|
| CA | 2372174 A1 * | 11/2000 |
| CN | 101985509 | 3/2011 |
| CN | 104845031 | 8/2015 |
| JP | 60-199048 | 10/1985 |
| JP | 61-123660 | 6/1986 |
| JP | 61-155445 | 7/1986 |
| JP | 09-059462 | 3/1997 |
| JP | 11-217411 | 8/1999 |
| JP | 2007-039489 | 2/2007 |
| JP | 2008-056904 | 3/2008 |
| KR | 10-2016-0080957 | 7/2016 |

OTHER PUBLICATIONS

International Search Report issued Nov. 14, 2023 in International (PCT) Application No. PCT/JP2023/033764.
Notice of Reasons for Rejection mailed Jan. 24, 2023 in Japanese Application No. 2022-169960, with English translation.
Decision to Grant a Patent mail Jun. 6, 2023 in Japanese Application No. 2022-169960, with English translation.

* cited by examiner

*Primary Examiner* — Mark S Kaucher
(74) *Attorney, Agent, or Firm* — Wenderoth, Lind & Ponack, L.L.P.

(57) ABSTRACT

What is provided is a graft copolymer (A) obtained by graft-polymerizing a monomer component (a) to a rubber-based polymer, in which the monomer component (a) contains 60% to 85% by mass of a mixture (a1) of α-methylstyrene and an aromatic vinyl compound other than α-methylstyrene with respect to the total mass of the monomer component (a), and the rubber content of the graft copolymer (A) is 35% by mass or more with respect to the total mass of the graft copolymer (A).

9 Claims, No Drawings

GRAFT COPOLYMER, RESIN COMPOSITION FOR PLATING, MOLDED ARTICLE, AND PLATED PRODUCT

TECHNICAL FIELD

The present invention relates to a graft copolymer, a resin composition for plating, a molded article, and a plated product. Priority is claimed on Japanese Patent Application No. 2022-169960, filed Oct. 24, 2022, the content of which is incorporated herein by reference.

BACKGROUND ART

A molded article consisting of an acrylonitrile-butadiene-styrene copolymer (ABS resin) has been used in a wide range of fields such as office automation (OA) equipment, information and communication equipment, electronic and electrical equipment, home appliances, automobiles, and architecture, because of its excellent impact resistance, mechanical strength, and chemical resistance.

In addition, in a case where the molded article consisting of the ABS resin is subjected to a plating treatment to obtain a plated product, the molded article has plating characteristics such as high adhesion strength of a plating film (plating adhesion strength) and excellent cooling/heating cycle characteristics. Therefore, the molded article has been used in various applications in combination with many functional resins in plastic plating applications. For example, in the automobile field, the molded article is used as a PC/ABS resin in combination with a polycarbonate resin from the viewpoint of impact resistance, heat resistance, and moldability.

The plating characteristics are likely to be affected by factors such as characteristics of a resin composition forming the molded article and molding conditions. Therefore, even in a case where a resin composition containing the ABS resin is used, there is a possibility that plating appearance defects may occur. In a case where the molding conditions are poor, the appearance defects of the molded article are adversely affected, and plating appearance defects such as peeling and floating of the plating film occur, which significantly impair a commercial value of the final product.

In Patent Document 1, in order to solve the problem that the plating appearance defects occur due to influence of nashiji or flow mark, which is an appearance defect of the molded article serving as a base, it has been proposed to use a graft copolymer obtained by adding a hard polymer having specific reaction conversion rate and mass-average molecular weight to 100 parts by mass of a rubber-containing graft copolymer.

CITATION LIST

Patent Document

[Patent Document 1] Japanese Unexamined Patent Application, First Publication No. 2007-39489

SUMMARY OF INVENTION

Technical Problem

However, although Patent Document 1 can solve the problem of the plating appearance due to the influence of the nashiji or flow mark generated on the molded article base, it does not solve a problem of the plating appearance defect due to minute irregularities (orange peel) generated on the base, which is not always sufficient.

An object of the present invention is to provide a resin composition for plating, and a graft copolymer, with which generation of minute irregularities (orange peel) generated on a base is suppressed, an excellent plating appearance is obtained, and a plated product having excellent plating adhesion strength and cooling/heating cycle is obtained.

Solution to Problem

The present invention has the following aspects.

[1] A graft copolymer (A) obtained by graft-polymerizing a monomer component (a) to a rubber-based polymer,
in which the monomer component (a) contains 60% by mass or more of a mixture (a1) of α-methylstyrene and an aromatic vinyl compound other than α-methylstyrene with respect to a total mass of the monomer component (a), and
a rubber content of the graft copolymer (A) is 35% by mass or more with respect to a total mass of the graft copolymer (A).

[2] The graft copolymer according to [1], in which, in a case where a total mass of the mixture (a1) is set to 100% by mass, a content of the α-methylstyrene in the mixture (a1) is more than 0% by mass and less than 28.6% by mass.

[3] The graft copolymer according to [1] or [2],
in which the aromatic vinyl compound other than α-methylstyrene is styrene, and
an amount of the styrene is 62.5% to 66.7% by mass with respect to the total mass of the monomer component (a).

[4] A resin composition for plating, containing:
the graft copolymer according to any one of [1] to [3],
in which a rubber content of the resin composition for plating is 10% to 18% by mass with respect to a total mass of the resin composition for plating.

[5] A molded article obtained by molding the resin composition for plating according to [4].

[6] A plated product including:
the molded article according to [5]; and
a plating film provided on at least a part of a surface of the molded article.

Advantageous Effects of Invention

According to the present invention, it is possible to provide a molded article, a resin composition for plating, and a graft copolymer, with which a plated product having excellent plating characteristics can be obtained.

DESCRIPTION OF EMBODIMENTS

The following definitions of terms apply throughout the present specification and claims.

The "molded article" is obtained by molding the resin composition for plating according to the embodiment of the present invention.

The "plated product" is obtained by performing a plating treatment on the molded article, and has a plating film on at least a part of a surface of the molded article.

The "excellent plating characteristics" means that the plating appearance is favorable, the plating adhesion strength is high, and the cooling/heating cycle characteristics are favorable.

"(Meth)acrylic acid" is a generic term for acrylic acid and methacrylic acid.

"(Meth)acrylate" is a generic term for acrylate and methacrylate.

"to" showing a numerical range means that numerical values described before and after the numerical range are included as the lower limit value and the upper limit value.

[Resin Composition for Plating]

The resin composition for plating according to a first aspect of the present invention contains a graft copolymer (A) according to a second aspect of the present invention. In addition, the resin composition for plating may further contain other components in addition to the graft copolymer (A) as necessary, as long as the effects of the present invention are not impaired.

<Graft Copolymer (A)>

The graft copolymer (A) is a copolymer obtained by graft-polymerizing a monomer component (a) to a rubber-based polymer. In the graft copolymer (A), it is not easy to specify how the monomer component (a) is polymerized to the rubber-based polymer. That is, in the graft copolymer (A), there is a reason that it is impossible to directly specify the graft copolymer (A) from its structure or properties or that it is almost impractical (impossible and impractical reason). Therefore, it is more appropriate to specify that the graft copolymer (A) is a "rubber-based polymer to which the monomer component (a) is graft-polymerized".

(Rubber-Based Polymer)

As the rubber-based polymer constituting the graft copolymer (A), for example, butadiene-based rubbers such as polybutadiene, a styrene-butadiene copolymer, and an acrylic acid ester-butadiene copolymer; conjugated diene-based rubbers such as a styrene-isoprene copolymer; acrylic rubbers such as polybutyl acrylate; olefin-based rubbers such as an ethylene-propylene copolymer; and silicone rubbers such as polyorganosiloxane are exemplary examples. These rubber-based polymers may contain an unreacted monomer. The rubber-based polymer may have a composite rubber structure or a core/shell structure. As the rubber-based polymer, from the viewpoint that balance between tint and impact resistance is favorable, a butadiene-based rubber, an acrylic rubber, or a composite rubber-based polymer thereof is preferable.

An average particle diameter of the rubber-based polymer is preferably 0.20 to 0.50 μm and more preferably 0.25 to 0.40 μm. In a case where the average particle diameter of the rubber-based polymer is equal to or more than the above-described lower limit value, plating-precipitating properties in a case of performing a plating treatment on a molded article are improved. In addition, the cooling/heating cycle characteristics of the plated product are further improved. In a case where the average particle diameter of the rubber-based polymer is equal to or less than the above-described upper limit value, the plating adhesion strength of the plated product is further increased. In addition, the fluidity of the resin composition for plating is increased. The average particle diameter of the rubber-based polymer can be calculated from a particle diameter distribution based on mass, which is measured using a particle size distribution analyzer. The average particle diameter of the rubber-based polymer can be controlled by adjusting polymerization conditions (temperature, time, and the like) during production of the rubber-based polymer, the type of monomer, and the blending proportion thereof.

A method for producing the rubber-based polymer is not particularly limited, but the rubber-based polymer is preferably produced by emulsion polymerization because it is easy to control the particle diameter. A known method can be adopted to the emulsion polymerization; and a catalyst, an emulsifier, and the like to be used are not particularly limited, and various known catalyst, emulsifier, and the like can be used.

The rubber-based polymer may be a swollen rubber. In addition, the average particle diameter, the distribution, and the like can be adjusted by the swelling operation. As the swelling method, a mechanical aggregation method, a chemical aggregation method, and an aggregation method using an acid group-containing copolymer are exemplary examples. As the chemical aggregation method, a method in which an acidic substance is added to a latex of the rubber-based polymer to make emulsification stability unstable and to aggregate until a target particle diameter is reached, and then an alkaline substance is added to re-stabilize the latex of the rubber-based polymer is an exemplary example. As the acidic substance, acetic acid, acetic acid anhydride, sulfuric acid, and phosphoric acid are exemplary examples. As the alkaline substance, potassium hydroxide and sodium hydroxide are exemplary examples. As the aggregation method using an acid group-containing copolymer, a method of obtaining a latex of a swollen rubber by mixing a latex of the rubber-based polymer with a latex of an acid group-containing copolymer is an exemplary example. As the latex of the acid group-containing copolymer, for example, latexes of acid group-containing copolymers obtained by polymerizing, in water, a monomer component including an acid group-containing monomer (for example, a carboxy group-containing monomer such as (meth)acrylic acid), an alkyl (meth)acrylate monomer, and other monomers copolymerizable with these monomers are exemplary examples.

(Monomer Component (a))

The monomer component (a) constituting the graft copolymer (A) includes a mixture (a1) of α-methylstyrene and an aromatic vinyl compound other than α-methylstyrene. It is preferable that the mixture (a1) contains only α-methylstyrene and the aromatic vinyl compound other than α-methylstyrene.

Furthermore, it is preferable to contain a vinyl cyanide compound (a2), and it may contain other vinyl compounds (a3) as necessary.

As the other aromatic vinyl compound contained in the mixture (a1), for example, styrene, vinyltoluenes (p-methylstyrene and the like), halogenated styrenes (p-bromostyrene, p-chlorostyrene, and the like), p-tert-butylstyrene, dimethylstyrene, and vinylnaphthalene are exemplary examples. Among these, styrene is preferable. The other aromatic vinyl compound may be used alone or a combination of two or more kinds thereof may be used.

As the vinyl cyanide compound (a2), for examples, acrylonitrile and methacrylonitrile are exemplary examples. Among these, acrylonitrile is preferable. These vinyl cyanide compounds (a2) may be used alone or a combination of two or more kinds thereof may be used.

The other vinyl compounds (a3) are vinyl compounds which are copolymerizable with the mixture (a1) of α-methylstyrene and the aromatic vinyl compound other than α-methylstyrene, and the vinyl cyanide compound (a2). As the vinyl compound, for example, methacrylic acid alkyl esters such as methyl methacrylate and ethyl methacrylate; acrylic acid alkyl esters such as methyl acrylate, ethyl acrylate, and butyl acrylate; maleimide compounds such as N-phenylmaleimide and N-cyclohexylmaleimide; and unsaturated carboxylic acid compounds such as (meth) acrylic acid, itaconic acid, and fumaric acid are exemplary examples. These other vinyl compounds (a3) may be used alone or a combination of two or more kinds thereof may be used.

A proportion of each vinyl compound in the monomer component (a) is preferably 60% to 85% by mass of the mixture (a1) of α-methylstyrene and the aromatic vinyl compound other than α-methylstyrene, 15% to 40% by mass of the vinyl cyanide compound (a2), and 0% to 25% by mass of the other vinyl compounds (a3) with respect to the total mass of the monomer component (a). In a case where the proportion of each compound is within the above-described range, the plating adhesion strength is improved.

In addition, the proportion of the above-described other aromatic vinyl compound (for example, styrene) to the total mass of the monomer component (a) is preferably 42.0% to 80.0% by mass, more preferably 50.0% to 75.0% by mass, still more preferably 60.0% to 70.0% by mass, and most preferably 62.5% to 66.7% by mass with respect to the total mass of the monomer component (a).

In addition, the proportion of the α-methylstyrene to the total mass of the monomer component (a) is preferably 1.0% to 40.0% by mass, more preferably 1.5% to 35.0% by mass, still more preferably 2.0% to 30.0% by mass, and most preferably 2.5% to 25.0% by mass with respect to the total mass of the monomer component (a).

The proportion of the α-methylstyrene in the above-described mixture (a1) is preferably more than 0% by mass and less than 28.6% by mass with respect to the total mass of the mixture (a1). In a case where the proportion of the α-methylstyrene to the total mass of the mixture (a1) is within the above-described range, the plating appearance is improved.

In addition, the proportion of the α-methylstyrene in the above-described mixture (a1) is more preferably 3.8% by mass or more and 26.5% by mass or less with respect to the total mass of the mixture (a1). In a case of being within the above-described range, the plating appearance is further improved.

Furthermore, the proportion of the α-methylstyrene in the above-described mixture (a1) is still more preferably 10.7% by mass or more and 21.9% by mass or less with respect to the total mass of the mixture (a1). In a case of being within the above-described range, both the plating appearance and the plating adhesion strength are improved.

(Rubber Content)

In the present invention, a proportion of the rubber-based polymer to the total mass of the graft copolymer (A) is referred to as "rubber content of graft copolymer (A)". A content proportion of the rubber-based polymer is 35% by mass or more and a content proportion of the monomer component (a) is 65% by mass or less, with respect to the total mass of the graft copolymer (A). In a case where the proportions of the rubber-based polymer and the monomer component (a) are within the above-described range, the plating adhesion strength and the cooling/heating cycle characteristics of the plated product are improved.

The proportion (rubber content) of the rubber-based polymer is more preferably 40% by mass or more and still more preferably 50% by mass or more with respect to the total mass of the graft copolymer (A). In addition, the proportion of the rubber-based polymer is preferably 80% by mass or less, more preferably 75% by mass or less, and still more preferably 70% by mass or less with respect to the total mass of the graft copolymer (A).

That is, the proportion of the rubber-based polymer is preferably 35% by mass or more and 80% by mass or less, more preferably 40% by mass to 75% by mass, and still more preferably 50% by mass to 70% by mass with respect to the total mass of the graft copolymer (A).

The proportion of the monomer component (a) is preferably 20% by mass or more and 65% by mass or less, more preferably 25% by mass to 60% by mass, and still more preferably 30% by mass to 50% by mass with respect to the total mass of the graft copolymer (A).

(Grafting Ratio)

As will be described in detail later, the plated product is obtained by performing a plating treatment on a molded article, but in order to improve adhesiveness of the plating film, the molded article is usually etched before the plating treatment. In a case where the molded article is subjected to the etching treatment, the rubber-based polymer is eluted in an etching liquid, and fine pores are formed on a surface of the molded article. It is considered that the plating adhesion strength is increased by a metal entering the fine pores. In general, as the shape of the fine pores is closer to a circular shape and the fine pores are distributed more uniformly, the plating adhesion strength and the cooling/heating cycle characteristics tend to be increased. The rubber-based polymer may be deformed or aggregated by a shear force in a case of molding the resin composition for plating. In a case where the rubber-based polymer is deformed, the shape of the fine pores formed by the etching treatment is also deformed. In addition, in a case where the rubber-based polymer is aggregated, a dispersion state of the fine pores is deteriorated. As a grafting ratio of the graft copolymer (A) is higher, it is less likely that the rubber-based polymer is deformed or aggregated during molding, and the plating adhesion strength and the cooling/heating cycle characteristics of the plated product tend to be increased.

In order to increase the grafting ratio, it is sufficient to reduce the rubber content of the graft copolymer (A) during the polymerization of the graft copolymer. However, as the rubber content is reduced, the impact resistance of the molded article tends to be lowered, and the plating adhesion strength of the plated product tends to be lowered.

As a result of intensive studies, the present inventors have found that, as the graft copolymer (A) according to a second aspect of the present invention, the monomer component (a) contains 60% by mass or more of the mixture (a1) of α-methylstyrene and the aromatic vinyl compound other than α-methylstyrene with respect to the total mass of the monomer component (a), and the rubber content of the graft copolymer (A) is 35% by mass or more with respect to the total mass of the graft copolymer (A). Therefore, it has been found that the molded article formed of the resin composition for plating according to the first aspect of the present invention, containing the above-described graft copolymer (A), exhibits favorable plating characteristics.

In addition, it has been found that, in a case where the above-described monomer component (a) constituting the graft copolymer according to the second aspect of the present invention contains the vinyl cyanide compound (a2) and the above-described other vinyl compounds (a3), and the rubber content of the graft copolymer (A) is 10% to 18% by mass with respect to the total mass of the resin composition for plating according to the first aspect of the present invention, containing the above-described graft copolymer (A), extremely favorable plating characteristics can be obtained.

A grafting ratio of the graft copolymer (A) is preferably 20% to 100% by mass, more preferably 25% to 95% by mass, and still more preferably 30% to 90% by mass.

The grafting ratio is a value indicating a mass (Wa) of the monomer component (a) graft-polymerized to the rubber-based polymer with respect to a mass (Wd) of the rubber-based polymer in a percentage ((Wa/Wd)×100). In general, the grafting ratio can be calculated from an acetone-insoluble fraction of the graft copolymer (A) obtained after the graft polymerization as follows. Acetone is added to the graft copolymer (A), and the mixture is heated at 55° C. for 3 hours to extract the acetone-soluble fraction. Next, the acetone-insoluble fraction is filtered and dried, and the mass thereof is measured to obtain the grafting ratio by the following expression (3). In the following expression (3), "m" is a mass (g) of the graft copolymer (A) before the extraction, "n" is a mass (g) of the acetone-insoluble fraction, and "L" is a rubber content (% by mass) of the graft copolymer (A).

$$\text{Grafting ratio (\%)} = \{(n - m \times L)/(m \times L)\} \times 100 \qquad (3)$$

The grafting ratio may be obtained by measuring the rubber-based polymer and the graft-polymerized monomer component (a) using an infrared spectrometer for a product obtained by filtering and drying the acetone-insoluble fraction. As a method for obtaining the acetone-insoluble fraction, in addition to the above-described method of obtaining the graft polymer (A) by dissolving the graft polymer (A) in acetone, the acetone-insoluble fraction may be obtained by dissolving the resin composition for plating in acetone. In a case where a polycarbonate resin is blended, a method of dissolving and removing the resin composition for plating in chloroform or the like is adopted. Thereafter, the rubber-based polymer and the graft-polymerized monomer component (a) can also be measured and obtained by an infrared spectrometer.

(Production Method)

The graft copolymer (A) is obtained by polymerizing (graft-polymerizing) the monomer component (a) in the presence of the rubber-based polymer. The graft copolymer (A) obtained in this manner has a form in which a vinyl-based copolymer obtained by polymerizing the monomer component (a) is grafted to the rubber-based polymer. A method for performing the graft polymerization is not particularly limited, but emulsion polymerization is preferable because the reaction can be stably controlled. Specifically, a method in which the monomer component (a) is charged into the latex of the rubber-based polymer at once and then polymerized; a method in which a part of the monomer component (a) is charged into the latex of the rubber-based polymer in advance, and the rest is added dropwise to the polymerization system while being polymerized; and a method in which all of the monomer component (a) is added dropwise to the latex of the rubber-based polymer, while being polymerized are exemplary examples. The polymerization of the monomer component (a) may be carried out in one step or two or more steps. In a case where the polymerization is carried out in two or more steps, it is also possible to carry out the polymerization by changing the type or compositional ratio of the vinyl compound constituting the monomer component (a) in each step. The graft copolymer (A) obtained by the emulsion polymerization is usually in a latex state. The polymerization condition may be, for example, 30° C. to 95° C. for 1 to 10 hours.

In the emulsion polymerization, a polymerization initiator, a chain transfer agent (molecular weight regulator), and an emulsifier are usually used. The rubber content of the graft copolymer (A) can be adjusted by the amount of the rubber-based polymer to be charged (blended). The grafting ratio can be adjusted by the amount of the rubber-based polymer and the monomer component (a) to be charged, and the amount of the polymerization initiator or the emulsifier to be used.

As the polymerization initiator, for example, a redox-based initiator in which an organic peroxide such as cumene hydroperoxide, diisopropylbenzene hydroperoxide, and paramentane hydroperoxide is combined with a reducing agent such as saccharide pyrroline acid and sulfoxylate; a persulfate such as potassium persulfate; and a peroxide such as benzoyl peroxide (BPO), azobisisobutyronitrile, lauroyl peroxide, tert-butyl peroxy laurate, and tert-butyl peroxymonocarbonate are exemplary examples. The polymerization initiator may be oil-soluble or water-soluble, or a combination thereof. These polymerization initiators may be used alone or a combination of two or more kinds thereof may be used. The polymerization initiator can be added to the latex of the rubber-based polymer in a lump or continuously. The used amount of the polymerization initiator is preferably 0.05 to 0.25 parts by mass and more preferably 0.08 to 0.2 parts by mass with respect to 100 parts by mass of the total of the rubber-based polymer and the monomer component (a).

As the chain transfer agent, for example, mercaptans such as octyl mercaptan, n-dodecyl mercaptan, tert-dodecyl mercaptan, n-hexamethyl mercaptan, n-tetradecyl mercaptan, and tert-tetradecyl mercaptan; terpinolenes; and dimers of α-methylstyrene are exemplary examples. These chain transfer agents may be used alone or in combination of two or more thereof. The chain transfer agent can be added to the latex of the rubber-based polymer in a lump or continuously. The used amount of the chain transfer agent is preferably 0.1 to 0.3 parts by mass and more preferably 0.1 to 0.2 parts by mass with respect to 100 parts by mass of the total of the rubber-based polymer and the monomer component (a).

As the emulsifier, for example, carboxylates such as sodium sarcosinate, potassium fatty acid, sodium fatty acid, potassium alkenylsuccinate, calcium rosinate, and disproportionated calcium rosinate; and alkylbenzenesulfonates are exemplary examples. These emulsifiers may be used alone or a combination of two or more kinds thereof may be used. The used amount of the emulsifier is preferably 0.1 to 0.4 parts by mass and more preferably 0.1 to 0.3 parts by mass with respect to 100 parts by mass of the total of the rubber-based polymer and the monomer component (a).

The graft copolymer (A) is usually obtained in a latex state. As a method for recovering the graft copolymer (A) from the latex of the graft copolymer (A), for example, a wet method in which the latex of the graft copolymer (A) is put into hot water in which a coagulant has been dissolved to be coagulated in a slurry form; and a spray drying method in which the latex of the graft copolymer (A) is sprayed in a heating atmosphere to be indirectly recovered as the graft copolymer (A) are exemplary examples.

As the coagulant used in the wet method, for example, inorganic acids such as sulfuric acid, hydrochloric acid, phosphoric acid, and nitric acid; and metal salts such as calcium chloride, calcium acetate, and aluminum sulfate are exemplary examples. The coagulant is selected according to the emulsifier used in the polymerization. For example, in a case where only the carboxylate is used as the emulsifier, one or more of the above-described coagulants can be used. In a case where an emulsifier which exhibits emulsifying power stable in an acidic region, such as sodium alkylbenzenesulfonate, is used as the emulsifier, a metal salt is suitable as the coagulant.

By the wet method, a slurry-like graft copolymer (A) is obtained. As a method for obtaining the graft copolymer (A) in a dry state from the slurry-like graft copolymer (A), a method in which the remaining emulsifier residues are first eluted and washed in water, and then the slurry is dehydrated with a centrifuge or a press dehydrator, and dried with an air flow dryer or the like; and a method in which dehydration and drying are simultaneously performed with a press dehydrator, an extruder, or the like are exemplary examples. According to such a method, a powdery or particulate dried graft copolymer (A) is obtained. Washing conditions are not particularly limited, but it is preferable to perform washing under the conditions that the amount of emulsifier residues contained in 100% by mass of the graft copolymer (A) after drying is 2% by mass or less. The graft copolymer (A) discharged from the press dehydrator or the extruder may not be collected and may be directly sent to an extruder or a molding machine for manufacturing the resin composition into a molded article.

<Other Thermoplastic Resins>

In the resin composition for plating according to the embodiment of the present invention, it is possible to use, as necessary, other thermoplastic resins in combination within a range in which the effects of the present invention are not impaired.

The other thermoplastic resins are not particularly limited, and for example, a styrene-based copolymer, a polycarbonate resin, a polyester resin, poly(methyl methacrylate), polyvinyl chloride, polyolefins such as polyethylene and polypropylene, various olefin-based elastomers, a polyacetal resin, a modified polyphenylene ether (modified PPE resin), an ethylene-vinyl acetate copolymer, a PPS resin, a PES resin, a PEEK resin, and a polyamide resin (nylon) are exemplary examples.

Among these, from the viewpoint that the effects of the present invention can be sufficiently exhibited, a styrene-based copolymer, a polycarbonate resin, a polyester resin, poly(methyl methacrylate), polyvinyl chloride, modified polyphenylene ether (modified PPE resin), or a polyamide resin is preferable.

(Styrene-Based Copolymer (C))

The styrene-based copolymer (C) is obtained by copolymerizing an aromatic vinyl compound (c1) with a vinyl cyanide compound (c2) and optionally other monovinyl compounds (c3). That is, the styrene-based copolymer (C) is a copolymer having a monomer unit derived from the aromatic vinyl compound (c1), a monomer unit derived from the vinyl cyanide compound (c2), and optionally a monomer unit derived from the other monovinyl compounds (c3).

The styrene-based copolymer may be used alone or a combination of two or more kinds thereof may be used.

As the aromatic vinyl compound (c1), the vinyl cyanide compound (c2), and the other vinyl compounds (c3) used as necessary in the styrene-based copolymer (C), the same compounds as the mixture (a1) of α-methylstyrene and the aromatic vinyl compound other than α-methylstyrene, the vinyl cyanide compound (a2), and the other vinyl compounds (a3) mentioned above in the description of the graft copolymer (A) can be used, and preferred aspects thereof are also the same.

The amount of the monomer unit derived from the aromatic vinyl compound (c1) in the styrene-based copolymer (C) is not particularly limited, and for example, it is preferably 50% to 85% by mass with respect to the total mass of the styrene-based copolymer (C). The amount of the monomer unit derived from the vinyl cyanide compound (c2) in the styrene-based copolymer (C) is not particularly limited, and for example, it is preferably 15% to 50% by mass with respect to the total mass of the styrene-based copolymer (C). The amount of the monomer unit derived from the other vinyl compounds (c3) in the styrene-based copolymer (C) is not particularly limited, and for example, it is preferably 0% to 35% by mass with respect to the total mass of the styrene-based copolymer (C). Here, it is preferable that the total amount of the components (c1) to (c3) is the total mass of the styrene-based copolymer (C).

A mass-average molecular weight of the styrene-based copolymer (C) is, for example, preferably 50,000 to 270,000. The mass-average molecular weight of the styrene-based copolymer (C) is a value in terms of standard polystyrene, which is measured by gel permeation chromatography (GPC).

The styrene-based copolymer (C) can be produced by copolymerizing the aromatic vinyl compound (c1) and the vinyl cyanide compound (c2), and optionally the other vinyl compounds (c3). As the polymerization method, known polymerization methods such as emulsion polymerization, suspension polymerization, bulk polymerization, and a method in which these methods are combined can be adopted.

As the styrene-based copolymer (C), styrene-based elastomers such as an acrylonitrile-styrene copolymer (AS resin), a styrene-acrylonitrile-N-substituted maleimide terpolymer, a styrene-maleic anhydride-N-substituted maleimide terpolymer, styrene-butadiene-styrene (SBS), styrene-butadiene (SBR), hydrogenated SBS, and styrene-isoprene-styrene (SIS); polystyrene; a methyl methacrylate-styrene copolymer (MS resin); and an acrylonitrile-styrene-methyl methacrylate copolymer are exemplary examples.

As a more preferred styrene-based copolymer (C), an acrylonitrile-styrene copolymer (AS resin), a styrene-acrylonitrile-N-substituted maleimide terpolymer, and a styrene-maleic anhydride-N-substituted maleimide terpolymer are exemplary examples.

(Polycarbonate Resin (P))

The polycarbonate resin (P) is a resin having a carbonate bond in the main chain. The polycarbonate resin (P) is not particularly limited, and for example, an aromatic polycarbonate resin, an aliphatic polycarbonate resin, an aliphatic-aromatic polycarbonate resin, and an aromatic polyester carbonate resin are exemplary examples. A terminal of these polycarbonate resins (P) may be modified to an R—CO-group or an R'—O—CO-group (R and R' each represent an organic group).

From the viewpoint of improving the impact resistance and heat resistance of the molded article, the polycarbonate resin (P) is preferably at least one selected from the group consisting of an aromatic polycarbonate resin and an aromatic polyester carbonate resin, and from the viewpoint of further improving the impact resistance, an aromatic polycarbonate resin is more preferable. The aromatic polycarbonate resin is a polymer having a constitutional unit represented by General Formula —(—O—X1-O—C(=O)—)—. X1 in the general formula is a hydrocarbon group having one or more aromatic rings, or a group obtained by introducing a heteroatom or a hetero bond into the hydrocarbon group. In X1, an atom directly bonded to an oxygen atom adjacent to X1 is a carbon atom constituting the aromatic ring. As the aromatic polycarbonate resin, for example, a reaction product of an ester exchange reaction between an aromatic dihydroxy compound and a carbonic acid diester, a polycondensate obtained by an interface polycondensation method of an aromatic dihydroxy compound and phosgene, and a polycondensate obtained by a pyridine method of an aromatic dihydroxy compound and phosgene are exemplary examples.

The aromatic dihydroxy compound may be a compound having two hydroxy groups bonded to an aromatic ring in the molecule, and for example, dihydroxybenzene such as hydroquinone and resorcinol, 4,4'-biphenol, 2,2-bis(4-hydroxyphenyl) propane (hereinafter, referred to as "bisphenol A"), 2,2-bis(3,5-dibromo-4-hydroxyphenyl) propane, 2,2-bis(4-hydroxyphenyl-3-methylphenyl) propane, 2,2-bis(3-tert-butyl-4-hydroxyphenyl) propane, 2,2-bis(3,5-dimethyl-4-hydroxyphenyl) propane, bis(4-hydroxyphenyl) methane, 1,1-bis(p-hydroxyphenyl) ethane, 2,2-bis(p-hydroxyphenyl) butane, 2,2-bis(p-hydroxyphenyl) pentane, 1,1-bis(p-hydroxyphenyl) cyclohexane, 1,1-bis(p-hydroxyphenyl)-4-isopropylcyclohexane, 1,1-bis(p-hydroxyphenyl)-3,3,5-trimethylcyclohexane, 1,1-bis(p-hydroxyphenyl)-1-phenylethane, 9,9-bis(p-hydroxyphenyl) fluorene, 9,9-bis(p-hydroxy-3-methylphenyl) fluorene, 4,4'-(p-phenylene diisopropylidene)bisphenol, 4,4'-(m-phenylene diisopropylidene)bisphenol, bis(p-hydroxyphenyl) oxide, bis(p-hydroxyphenyl) ketone, bis(p-hydroxyphenyl) ether, bis(p-hydroxyphenyl) ester, bis(p-hydroxyphenyl) sulfide, bis(p-hydroxy-3-methylphenyl) sulfide, bis(p-hydroxyphenyl) sulfone, bis(3,5-dibromo-4-hydroxyphenyl) sulfone, and bis (p-hydroxyphenyl) sulfoxide are exemplary examples. These aromatic dihydroxy compounds may be used alone or a combination of two or more kinds thereof may be used.

As the aromatic dihydroxy compound, a compound having a hydrocarbon group between two benzene rings is preferable. In the compound, as the hydrocarbon group, an alkylene group is an exemplary example. The hydrocarbon group may be a halogen-substituted hydrocarbon group. The benzene ring may be a benzene ring in which a hydrogen atom included in the benzene ring is substituted with a halogen atom. As the compound having a hydrocarbon group between two benzene rings, bisphenol A, 2,2-bis(3, 5-dibromo-4-hydroxyphenyl) propane, 2,2-bis(4-hydroxyphenyl-3-methylphenyl) propane, 2,2-bis(3-tert-butyl-4-hydroxyphenyl) propane, 2,2-bis(3,5-dimethyl-4-hydroxyphenyl) propane, bis(4-hydroxyphenyl) methane, 1,1-bis(p-hydroxyphenyl) ethane, and 2,2-bis(p-hydroxyphenyl) butane are exemplary examples. Among these, bisphenol A is preferable. The compound having a hydrocarbon group between two benzene rings may be used alone or a combination of two or more kinds thereof may be used.

As the carbonic acid diester used for obtaining the aromatic polycarbonate by an ester exchange reaction, for example, dimethyl carbonate, diethyl carbonate, di-tert-butyl carbonate, diphenyl carbonate, and di-tolyl carbonate are exemplary examples. These carbonic acid diesters may be used alone or a combination of two or more kinds thereof may be used.

The polycarbonate resin (P) may be used alone or a combination of two or more kinds thereof may be used. For example, two or more kinds of polycarbonate resins having different viscosity-average molecular weights may be used in combination. A molecular weight of the polycarbonate resin (P) is optional and is not particularly limited, but a viscosity-average molecular weight (Mv) calculated from a solution viscosity is usually preferably 15,000 to 40,000, more preferably 17,000 to 30,000, and particularly preferably 18,000 to 28,000. In a case where the viscosity-average molecular weight is equal to or more than the above-described lower limit value, the impact resistance of the molded article is improved. In a case where the viscosity-average molecular weight is equal to or less than the upper limit value, the fluidity of the resin composition for plating is improved.

The viscosity-average molecular weight (Mv) of the polycarbonate resin (P) is a value measured by a solution viscosity method. Specifically, a solution (sample) prepared by dissolving 0.7 g of the polycarbonate resin (P) in 100 mL of methylene chloride is used for obtaining an intrinsic viscosity [η] (unit: dl/g) at a temperature of 25° C. using an Ubbelohde viscometer, and the viscosity-average molecular weight (Mv) is obtained from the following expression (4).

$$[\eta] = 1.23 \times 10-4 \times Mv0.83 \qquad (4)$$

(Polyester Resin (E))

As a preferred polyester resin (E), polyethylene terephthalate (PET resin), polybutylene terephthalate, polytetramethylene terephthalate, polybutylene naphthalate, various polyester-based elastomers, polyarylate, and a liquid crystal polyester resin are exemplary examples. These polyester resins may be used alone or a combination of two or more kinds thereof may be used.

In addition, the PET resin more preferably used is obtained by solid-phase polymerizing recycled and/or re-pelletized PET resin. Specifically, a product obtained by solid-phase polymerizing a recycled PET resin, a re-pelletized PET resin, a recycled and re-pelletized PET resin, or the like is an exemplary example.

The recycled PET resin is a recycled product obtained by recovering a PET resin product obtained through a molding step of the PET resin and recycling the product. The PET resin product typically includes used PET bottles and food trays, but the PET resin product is not limited thereto, and off-grade products of the PET resin product, waste materials generated in a molding process, and the like can also be targeted. Therefore, by using the recycled and/or re-pelletized PET resin, resources can be effectively utilized.

For the recycled material obtained by collecting used PET bottles, food trays, or the like, it is necessary to avoid mixing of different materials or metals by sorting. In addition, in a case where the PET resin is washed with alkaline water or the like, it is necessary to sufficiently wash the PET resin with water and then dry the PET resin so that an alkaline component which promotes hydrolysis of the PET resin does not remain.

A shape of the recycled PET resin is generally flake-like, and an average particle diameter thereof is preferably 2 to 5 mm. In addition, a pelletized (re-pelletized) product may be used for removing the foreign matter.

As the re-pelleted PET resin, pellets of the recycled PET resin, and pellets of a commercially available pellet-like product (virgin material) are exemplary examples. The pelletization can be carried out using an extruder or the like.

The PET resin may be used alone or a combination of two or more kinds thereof may be used.

The other thermoplastic resins may be used alone or a combination of two or more kinds thereof may be used.

For example, a combination of an acrylonitrile-styrene copolymer (AS resin) of the styrene-based copolymer (C) and a styrene-acrylonitrile-N-substituted maleimide terpolymer, a combination of two types of the styrene-based copolymer (C) and the polycarbonate resin (P), and a combination of three types of the styrene-based copolymer (C), the polycarbonate resin (P), and the polyester resin (E) are exemplary examples.

In a case where the other thermoplastic resins are a combination of the styrene-based copolymer (C) and the polycarbonate resin (P), it is preferable that the styrene-based copolymer resin (C) is contained in an amount of 1% to 55% by mass, 5% to 52% by mass, or 6% to 50% by mass, and the polycarbonate resin (P) is contained in an amount of 45% to 99% by mass, 48% to 95% by mass, or 50% to 94% by mass (here, the total amount of the styrene-based copolymer (C) and the polycarbonate resin (P) is set to 100% by mass).

In a case where the other thermoplastic resins are a combination of the styrene-based copolymer (C), the polycarbonate resin (P), and the polyester resin (E), it is preferable that the styrene-based copolymer (C) is contained in an amount of 1% to 55% by mass, 5% to 52% by mass, or 6% to 50% by mass, the polycarbonate resin (P) is contained in an amount of 30% to 98% by mass, 38% to 94% by mass, or 43% to 93% by mass, and the polyester resin (E) is contained in an amount of 1% to 15% by mass, 1% to 10% by mass, or 1% to 7% by mass (here, the total amount of the styrene-based copolymer (C), the polycarbonate resin (P), and the polyester resin (E) is set to 100% by mass).

In a case where each component is within the above-described range, the balance of moldability, mechanical strength, and plating properties of a reinforcing resin composition for a plated base material is further improved.

<Other Components>

As other components, various additives and other resins are exemplary examples. As the additive, for example, known antioxidants, light stabilizers, ultraviolet absorbers, lubricants, plasticizers, stabilizers, ester exchange reaction inhibitors, hydrolysis inhibitors, mold release agents, antistatic agents, colorants (pigments, dyes, and the like), fillers such as carbon fibers, glass fibers, wollastonite, calcium carbonate, silica, and talc, flame retardants such as bromine-based flame retardants and phosphorus-based flame retardants, flame retardant auxiliaries such as antimony trioxide, drip inhibitors such as fluororesins, antibacterial agents, antifungal agents, silicone oil, and coupling agents are exemplary examples. These additives may be used alone or a combination of two or more kinds thereof may be used.

All essential components and optional components used in the present invention can be used as a recovered product in a polymerization step, a processing step, a step during molding, or the like, or a recycled product recovered from the market, as long as there is no problem in quality.

<Amount of Each Component>

The amount of the graft copolymer (A) is preferably 10% to 50% by mass and more preferably 15% to 40% by mass with respect to the total mass of the resin composition for plating. In a case where the amount of the graft copolymer (A) is equal to or more than the above-described lower limit value, the fluidity of the resin composition for plating is improved. In addition, the impact resistance of the molded article is improved. In a case where the amount of the graft copolymer (A) is equal to or less than the upper limit value, the plating-precipitating properties are improved.

The amount of the other components is preferably 0% to 60% by mass, more preferably 0% to 10% by mass, and still more preferably 0% to 2% by mass with respect to the total mass (100% by mass) of the resin composition for plating.

The amount of the resin main component with respect to the total mass (100% by mass) of the plating resin composition according to the first aspect is 60% by mass or more, preferably 70% by mass or more, more preferably 90% by mass or more, still more preferably 95% by mass or more, and may be 100% by mass.

In a case where the above-described resin main component is composed of the graft copolymer (A) and the styrene-based copolymer (C), the amount of the styrene-based copolymer (C) with respect to 25 parts by mass of the amount of the graft copolymer (A) in the resin main component is preferably 60 to 90 parts by mass, more preferably 65 to 85 parts by mass, and still more preferably 70 to 80 parts by mass.

In a case where the above-described resin main component is composed of the graft copolymer (A), the styrene-based copolymer (C), and the polycarbonate resin (P), with respect to 25 parts by mass of the amount of the graft copolymer (A) in the resin main component, the amount of the styrene-based copolymer (C) is preferably 1 to 45 parts by mass, and the amount of the polycarbonate resin (P) is preferably 30 to 80 parts by mass.

In a case where the resin main component is composed of the graft copolymer (A), the styrene-based copolymer (C), the polycarbonate resin (P), and the polyester resin (E), with respect to 25 parts by mass of the amount of the graft copolymer (A) in the resin main component, the amount of the styrene-based copolymer (C) is preferably 1 to 45 parts by mass, more preferably 10 to 35 parts by mass, and still more preferably 15 to 25 parts by mass; the amount of the polycarbonate resin (P) is preferably 30 to 80 parts by mass, more preferably 35 to 60 parts by mass, and still more preferably 40 to 55 parts by mass; and the amount of the polyester resin (E) is preferably 1 to 50 parts by mass, more preferably 2 to 30 parts by mass, and still more preferably 3 to 10 parts by mass.

In a case where the resin main component has the above-described suitable composition, the plating characteristics (excellent appearance, plating adhesion strength, and cooling/heating cycle resistance) of the plating resin composition are further improved.

<Rubber Content>

The rubber content of the resin composition for plating is 10% to 18% by mass with respect to the total mass of the resin composition for plating. In a case where the rubber content is equal to or more than the above-described lower limit value, the plating adhesion strength of the plated product is improved. In a case where the rubber content is equal to or less than the above-described upper limit value, the cooling/heating cycle characteristics of the plated product are improved. The rubber content of the resin composition for plating can be obtained by measuring using an infrared spectrometer, or from the amount of the rubber-based polymer used and the blending amount of the graft copolymer (A).

<Method for Producing Resin Composition for Plating>

The resin composition for plating according to the first aspect of the present invention is a thermoplastic resin composition containing the graft copolymer (A), and is produced by mixing and kneading the graft copolymer (A) with other thermoplastic resins or other components used as necessary. A method of mixing and kneading each component is not particularly limited, and any general mixing and kneading method can be adopted. For example, a method of cutting and pelletizing after kneading with an extruder, a Banbury mixer, a kneading roll, or the like, are exemplary examples. The thermoplastic resin composition for plating according to the embodiment of the present invention can be molded into a molded article.

[Molded Article]

The molded article is formed of the resin composition for plating according to the embodiment of the present invention described above. The molded article is obtained by molding the resin composition for plating according to the embodiment of the present invention. As a molding method, for example, an injection molding method, an extrusion molding method, a compression molding method, an insert molding method, a vacuum molding method, and a blow molding method are exemplary examples.

Since the molded article is formed of the resin composition for plating according to the embodiment of the present invention, the molded article has an excellent molding appearance and excellent plating characteristics. That is, the excellent plating adhesion strength is exhibited in a case of performing the plating treatment, the plating appearance is less likely to change in the cooling/heating cycle, and the plating appearance is also excellent.

[Plated Product]

The plated product includes the above-described molded article, and a plating film formed on at least a part of a surface of the molded article. The plated product is obtained by performing a plating treatment on the molded article. The plating treatment method is not particularly limited, and for example, an electrodeless plating method, a direct plating method, and a non-chromium plating method are exemplary examples. In addition, it is preferable to perform an etching treatment using an etching liquid such as a permanganate solution or a chromic acid solution before the plating treatment.

Since the plated product is obtained by performing a plating treatment on at least a part of the surface of the molded article which is obtained by molding the resin composition for plating according to the embodiment of the present invention to form a plating film, the adhesion strength and cooling/heating cycle between the molded article and the plating film are excellent. In addition, since a base of the molded article obtained by molding the resin composition for plating according to the embodiment of the present invention does not have minute irregularities, the plating appearance is also excellent.

The plated product can be suitably used for various applications such as office automation (OA) equipment, information and communication equipment, electronic and electrical equipment, home appliances, automobiles, and architecture.

EXAMPLES

A description will be given below of the present invention using Examples, but the present invention is not limited thereto. The various measurements and evaluation methods in Examples and Comparative Examples are as follows. In the following description, unless otherwise specified, "part" means "part by mass" and "%" means "% by mass".

[Measurement and Evaluation Method]

<Mass Particle Diameter Distribution of Rubber-Based Polymer>

A water-diluted solution of a latex of a rubber-based polymer was used for measuring a particle diameter distribution based on mass using a nano-particle size distribution analyzer (manufactured by Nikkiso Co., Ltd., "NANO-TRACK UPA-EX150") based on a dynamic light scattering theory, and a mass-average particle diameter (μm) thereof was obtained from the obtained particle diameter distribution.

<Measurement of Mass-Average Molecular Weight (Mw) of Styrene-Based Copolymer (C)>

A mass-average molecular weight (Mw) of the styrene-based copolymer (C) was measured using a GPC device (manufactured by Tosoh Corporation) with a solution obtained by dissolving the styrene-based copolymer (C) in tetrahydrofuran as a measurement sample, and calculated by a standard polystyrene conversion method.

<Evaluation of Plating Appearance>

Pellets of the resin composition for plating were injection-molded using an 80-ton injection molder (manufactured by Nippon Steel & Sumikin Engineering Co., Ltd., "J80ADS-110U") to obtain a test piece (100 mm in length×100 mm in width×3 mm in thickness). The injection molding was performed under the conditions of a cylinder temperature of 250° C., a mold temperature of 60° C., and an injection speed of 50 mm/sec. The obtained test piece was subjected to a plating processing, and the plating appearance was visually observed and evaluated according to the following standard.

A (4 points): no minute irregularities were observed on the surface of the plated product, and the surface condition was extremely excellent.

B (3 points): minute irregularities were slightly observed on the surface of the plated product, but the surface condition was excellent.

C (2 points): it was a level at which the surface of the plated product had minute irregularities, but it was determined that the product was practically usable.

D (1 point): numerous minute irregularities were observed on the surface of the plated product, and the surface condition was not reached the practical level.

(Plating Process A)

In the evaluation of the plating appearance, the plating processing was carried out by the following procedures (1) to (17). (1) Degreasing→(2) Water washing→(3) Etching→(4) Water washing→(5) Acid treatment→(6) Water washing→(7) Catalyzing treatment→(8) Water washing→(9) Activation treatment→(10) Water washing→(11) Chemical Ni plating→(12) Water washing→(13) Copper electroplating→(14) Water washing→(15) Ni electro plating→(16) Water washing→(17) Cr electroplating Conditions in Each Step (1) Degreasing: the test piece was treated with a CRP cleaner (manufactured by Okuno Pharmaceutical Co., Ltd.) at 50° C. for 5 minutes.

(2) Water washing: the water washing was performed at 20° C.; the water washing after (4) was also performed under the same conditions as in (2).

(3) Etching: the etching treatment was performed using a mixed solution of 400 g/L of chromic acid anhydride and 200 mL/L of sulfuric acid as an etching liquid; dipping conditions were set to 68° C.×20 minutes.

(5) Acid treatment: the test piece was immersed in 100 mL of 35% hydrochloric acid at 23° C. for 1 minute.

(7) Catalyzing treatment: the test piece was immersed in a mixed solution of 40 mL/L of a CRP catalyst and 250 mL/L of 35% hydrochloric acid (Pd—Sn colloid catalyst) at 30° C. for 3 minutes.

(9) Activation treatment: the test piece was immersed in 100 mL of sulfuric acid at 40° C. for 3 minutes.

(11) Chemical Ni plating: the test piece was immersed in a mixed solution of 160 mL/L of Chemical nickel A (manufactured by OKUNO CHEMICAL INDUSTRIES CO., LTD.) and 160 mL/L of Chemical nickel B (manufactured by OKUNO CHEMICAL INDUSTRIES CO., LTD.) at 35° C. for 5 minutes, thereby forming a chemical plating film having a film thickness of 0.5 μm.

(13) Copper electroplating: the test piece was immersed in a mixed solution of 200 g/L of copper sulfate, 30 mL/L of sulfuric acid, and a brightening agent at 20° C. and a current density of 3 A/dm² for 20 minutes to form a copper plating film having a film thickness of 20 μm.

(15) Ni electroplating: the test piece was immersed in a mixed solution of 200 g/L of nickel sulfate, 45 g/L of nickel chloride, 45 g/L of boric acid, and a brightening agent at 55° C. and a current density of 3 A/dm² for 15 minutes to form a nickel plating film having a film thickness of 10 μm.

(17) Cr electroplating: the test piece was immersed in a mixed solution of 200 g/L of chromic acid anhydride and 1.5 g/L of sulfuric acid at 45° C. and a current density of 15 A/dm² for 2 minutes to form a chromium plating film having a film thickness of 0.3 μm.

<Evaluation of Plating Adhesion Strength>

Pellets of the resin composition for plating were injection-molded using an 80-ton injection molder (manufactured by The Japan Steel Works, Ltd., "J80ADS-110U") to obtain a test piece (90 mm in length×50 mm in width×3 mm in thickness). The injection molding was performed under the conditions of a molding temperature of 250° C., a mold temperature of 60° C., and an injection speed of 5 mm/sec. The obtained test piece was subjected to a plating treatment as follows, the plating film was peeled off in a vertical direction on a load measuring device to measure the strength thereof, and the plating adhesion strength was determined according to the following standard.

A (4 points): plating adhesion strength was 15 N/cm or more, which was extremely excellent.

B (3 points): plating adhesion strength was 12 N/cm or more and less than 15 N/cm, which was excellent.

C (2 points): plating adhesion strength was 8 N/cm or more and less than 12 N/cm, which was practically acceptable.

D (1 point): plating adhesion strength was less than 8 N/cm, or the plating film was not deposited on the entire surface of the test piece (could not be evaluated), which was not reached the practical level.

(Plating Process B)

In the evaluation of the plating adhesion strength, the plating processing was carried out by the following procedures (1) to (15). (1) Degreasing→(2) Water washing→(3) Etching→(4) Water washing→(5) Acid treatment→(6) Water washing→(7) Catalyzing treatment→(8) Water washing→(9) Activation treatment→(10) Water washing→(11) Chemical Ni plating→(12) Water washing→(13) Copper electroplating→(14) Water washing→(15) Drying Conditions in Each Step (1) Degreasing: the test piece was treated with a 50 mL/L solution of a CRP cleaner (manufactured by Okuno Pharmaceutical Co., Ltd.) at 50° C. for 5 minutes.

(2) Water washing: the water washing was performed at 20° C.; the water washing after (4) was also performed under the same conditions as in (2).

(3) Etching: the etching treatment was performed using a mixed solution of 400 g/L of chromic acid anhydride and 200 mL/L of sulfuric acid as an etching liquid; dipping conditions were set to 68° C.×15 minutes.

(5) Acid treatment: the test piece was immersed in 100 mL of 35% hydrochloric acid at 23° C. for 1 minute.

(7) Catalyzing treatment: the test piece was immersed in a mixed solution of 40 mL/L of a CRP catalyst and 250 mL/L of 35% hydrochloric acid (Pd—Sn colloid catalyst) at 30° C. for 3 minutes.

(9) Activation treatment: the test piece was immersed in 100 mL of sulfuric acid at 40° C. for 3 minutes.

(11) Chemical Ni plating: the test piece was immersed in a mixed solution of 160 mL/L of Chemical nickel A (manufactured by OKUNO CHEMICAL INDUSTRIES CO., LTD.) and 160 mL/L of Chemical nickel B (manufactured by OKUNO CHEMICAL INDUSTRIES CO., LTD.) at 35° C. for 5 minutes, thereby forming a chemical plating film having a film thickness of 0.5 μm.

(13) Copper electroplating: the test piece was immersed in a mixed solution of 200 g/L of copper sulfate, 30 mL/L of sulfuric acid, and a brightening agent at 20° C. and a current density of 3 A/dm² for 60 minutes to form a copper plating film having a film thickness of 35 μm.

(15) Drying: the test piece was dried at 80° C. for 2 hours.

<Evaluation of Cooling/Heating Cycle Characteristics>

Pellets of the resin composition for plating were injection-molded using an 80-ton injection molder (manufactured by The Japan Steel Works, Ltd., "J80ADS-110U") to obtain a test piece (100 mm in length×100 mm in width×3 mm in thickness). The injection molding was performed under the conditions of a cylinder temperature of 250° C., a mold temperature of 60° C., and an injection speed of 50 mm/sec. The obtained test piece was subjected to a plating treatment as follows, and one cycle of [cooling at −35° C. for 1 hour and heating at 90° C. for 1 hour] was performed for ten cycles. Thereafter, the state of the plating film of the plated product was visually observed, and the cooling/heating cycle characteristics were determined according to the following standard.

A (3 points): there was no form change such as plating swelling and peeling on the effective surface of the plated product, which was extremely excellent.

B (2 points): there was a slight form change such as swelling and peeling on the effective surface of the plated product, which was at a level that did not cause any practical problem.

C (1 point): form change such as swelling and peeling was observed on the effective surface of the plated product, or the plating film was not deposited on the entire surface of the test piece (could not be evaluated), which was not reached the practical level.

(Plating Process)

In the evaluation of the cooling/heating cycle characteristics, the plating treatment was performed by the same procedure as in the above-described plating process B to obtain a plated product.

<Comprehensive Determination>

With regard to the above-described evaluation results, a case where the total number of points was 12 to 20 points was determined as "O" excellent in the comprehensive determination, and a case where the total number of points was 11 points or less or a case where any one of the evaluation results was 1 point was determined as "X" inferior in the comprehensive determination.

[Production of Graft Copolymer (A)]

Synthesis Example 1: Production of Rubber-Based Polymer (g-1)

150 parts of water, 3.3 parts of potassium salt of beef tallow fatty acid, 0.14 parts of potassium hydroxide, 0.3 parts of sodium pyrophosphate, and 0.20 parts of t-dodecyl mercaptan were charged into a reactor, 100 parts of 1,3-butadiene was charged thereinto, and the temperature of the inside of the reactor was raised to 62° C. Next, 0.12 parts of potassium persulfate was charged thereinto, and polymerization was started. The reaction was carried out such that the temperature was raised to 75° C. over 10 hours. Furthermore, 0.08 parts of sodium formaldehyde sulfoxylate was charged thereinto after the reaction was carried out at 75° C. for 1 hour. After removing the residual 1,3-butadiene, the polymerization product was taken out to obtain a latex of a rubber-based polymer. A mass-average particle diameter of the obtained rubber-based polymer was 0.08 μm. 100 parts of the latex of the rubber-based polymer in terms of solid content and 0.15 parts of sodium dodecylbenzenesulfonate were charged into a reactor, and water was added thereto to adjust the solid content to 36.5%. After raising the temperature to 30° C., 1.3 parts of acetic acid was added thereto, and the mixture was stirred for 10 minutes and neutralized with potassium hydroxide to obtain a latex of a rubber-based polymer (g-1). A mass-average particle diameter of the obtained rubber-based polymer (g-1) was 0.30 μm.

Synthesis Example 2: Graft Copolymer (A-1)

180 parts of water (including water in the latex of the rubber-based polymer (g-1)), 60 parts of the latex of the rubber-based polymer (g) in terms of solid content, and 0.18 parts of disproportionated potassium rosinate were added to a sealed reactor including a reagent injection container, a cooling pipe, a nitrogen replacement device, a jacket heater, and a stirring device, and the liquid temperature inside the reactor was raised to 55° C. while replacing the air with nitrogen, and maintained for 30 minutes. Thereafter, a solution obtained by dissolving 0.15 parts of sodium pyrophosphate, 0.008 parts of iron (II) sulfate heptahydrate, and 0.3 parts of glucose in 8 parts of ion exchange water was added thereto. Next, a mixed solution of 10 parts of acrylonitrile, 25 parts of styrene, 5 parts of α-methylstyrene, 0.1 parts of cumene hydroperoxide, and 0.12 parts of tert-dodecyl mercaptan was added dropwise thereto for 4.5 hours to carry out polymerization. After the dropwise addition, the mixture was stirred for 30 minutes while maintaining the internal temperature at 55° C., and then cooled to obtain a latex of a graft copolymer. The obtained latex of the graft copolymer was diluted 1.25 times with distilled water, and was gradually added dropwise to a 3% sulfuric acid aqueous solution at 50° C. After the dropwise addition of the total amount, the temperature was raised to 90° C. and maintained for 5 minutes to be coagulated. Next, the coagulated product was centrifuged with a filter cloth, and the graft copolymer in a wet powdery state was dried to obtain a graft copolymer (A-1).

Synthesis Example 3: Graft Copolymer (A-2)

180 parts of water (including water in the latex of the rubber-based polymer (g-1)), 60 parts of the latex of the rubber-based polymer (g) in terms of solid content, and 0.18 parts of disproportionated potassium rosinate were added to a sealed reactor including a reagent injection container, a cooling pipe, a nitrogen replacement device, a jacket heater, and a stirring device, and the liquid temperature inside the reactor was raised to 55° C. while replacing the air with nitrogen, and maintained for 30 minutes. Thereafter, a solution obtained by dissolving 0.15 parts of sodium pyrophosphate, 0.008 parts of iron (II) sulfate heptahydrate, and 0.3 parts of glucose in 8 parts of ion exchange water was added thereto. Next, a mixed solution of 12 parts of acrylonitrile, 25 parts of styrene, 3 parts of α-methylstyrene, 0.1 parts of cumene hydroperoxide, and 0.12 parts of tert-dodecyl mercaptan was added dropwise thereto for 4.5 hours to carry out polymerization. After the dropwise addition, the mixture was stirred for 30 minutes while maintaining the internal temperature at 55° C., and then cooled to obtain a latex of a graft copolymer. The obtained latex of the graft copolymer was diluted 1.25 times with distilled water, and was gradually added dropwise to a 3% sulfuric acid aqueous solution at 50° C. After the dropwise addition of the total amount, the temperature was raised to 90° C. and maintained for 5 minutes to be coagulated. Next, the coagulated product was centrifuged with a filter cloth, and the graft copolymer in a wet powdery state was dried to obtain a graft copolymer (A-2).

Synthesis Example 4: Graft Copolymer (A-3)

180 parts of water (including water in the latex of the rubber-based polymer (g-1)), 60 parts of the latex of the rubber-based polymer (g) in terms of solid content, and 0.18 parts of disproportionated potassium rosinate were added to a sealed reactor including a reagent injection container, a cooling pipe, a nitrogen replacement device, a jacket heater, and a stirring device, and the liquid temperature inside the reactor was raised to 55° C. while replacing the air with nitrogen, and maintained for 30 minutes. Thereafter, a solution obtained by dissolving 0.15 parts of sodium pyrophosphate, 0.008 parts of iron (II) sulfate heptahydrate, and 0.3 parts of glucose in 8 parts of ion exchange water was added thereto. Next, a mixed solution of 8 parts of acrylonitrile, 25 parts of styrene, 7 parts of α-methylstyrene, 0.1 parts of cumene hydroperoxide, and 0.12 parts of tert-dodecyl mercaptan was added dropwise thereto for 4.5 hours to carry out polymerization. After the dropwise addition, the mixture was stirred for 30 minutes while maintaining the internal temperature at 55° C., and then cooled to obtain a latex of a graft copolymer. The obtained latex of the graft copolymer was diluted 1.25 times with distilled water, and was gradually added dropwise to a 3% sulfuric acid aqueous solution at 50° C. After the dropwise addition of the total amount, the temperature was raised to 90° C. and maintained for 5 minutes to be coagulated. Next, the coagulated product was centrifuged with a filter cloth, and the graft copolymer in a wet powdery state was dried to obtain a graft copolymer (A-3).

Synthesis Example 5: Graft Copolymer (A-4)

180 parts of water (including water in the latex of the rubber-based polymer (g-1)), 60 parts of the latex of the rubber-based polymer (g) in terms of solid content, and 0.18 parts of disproportionated potassium rosinate were added to a sealed reactor including a reagent injection container, a cooling pipe, a nitrogen replacement device, a jacket heater, and a stirring device, and the liquid temperature inside the reactor was raised to 55° C. while replacing the air with nitrogen, and maintained for 30 minutes. Thereafter, a solution obtained by dissolving 0.15 parts of sodium pyrophosphate, 0.008 parts of iron (II) sulfate heptahydrate, and 0.3 parts of glucose in 8 parts of ion exchange water was added thereto. Next, a mixed solution of 14 parts of acrylonitrile, 25 parts of styrene, 1 part of α-methylstyrene, 0.1 parts of cumene hydroperoxide, and 0.12 parts of tert-dodecyl mercaptan was added dropwise thereto for 4.5 hours to carry out polymerization. After the dropwise addition, the mixture was stirred for 30 minutes while maintaining the internal temperature at 55° C., and then cooled to obtain a latex of a graft copolymer. The obtained latex of the graft copolymer was diluted 1.25 times with distilled water, and was gradually added dropwise to a 3% sulfuric acid aqueous solution at 50° C. After the dropwise addition of the total amount, the temperature was raised to 90° C. and maintained for 5 minutes to be coagulated. Next, the coagulated product was centrifuged with a filter cloth, and the graft copolymer in a wet powdery state was dried to obtain a graft copolymer (A-4).

Synthesis Example 6: Graft Copolymer (A-5)

180 parts of water (including water in the latex of the rubber-based polymer (g-1)), 60 parts of the latex of the rubber-based polymer (g) in terms of solid content, and 0.18 parts of disproportionated potassium rosinate were added to a sealed reactor including a reagent injection container, a cooling pipe, a nitrogen replacement device, a jacket heater, and a stirring device, and the liquid temperature inside the reactor was raised to 55° C. while replacing the air with nitrogen, and maintained for 30 minutes. Thereafter, a solution obtained by dissolving 0.15 parts of sodium pyrophosphate, 0.008 parts of iron (II) sulfate heptahydrate, and 0.3 parts of glucose in 8 parts of ion exchange water was added thereto. Next, a mixed solution of 6 parts of acrylonitrile, 25 parts of styrene, 9 parts of α-methylstyrene, 0.1 parts of cumene hydroperoxide, and 0.12 parts of tert-dodecyl mercaptan was added dropwise thereto for 4.5 hours to carry out polymerization. After the dropwise addition, the mixture was stirred for 30 minutes while maintaining the internal temperature at 55° C., and then cooled to obtain a latex of a graft copolymer. The obtained latex of the graft copolymer was diluted 1.25 times with distilled water, and was gradually added dropwise to a 3% sulfuric acid aqueous solution at 50° C. After the dropwise addition of the total amount, the temperature was raised to 90° C. and maintained for 5 minutes to be coagulated. Next, the coagulated product was centrifuged with a filter cloth, and the graft copolymer in a wet powdery state was dried to obtain a graft copolymer (A-5).

Synthesis Example 7: Graft Copolymer (A-6)

180 parts of water (including water in the latex of the rubber-based polymer (g-1)), 40 parts of the latex of the rubber-based polymer (g) in terms of solid content, and 0.18 parts of disproportionated potassium rosinate were added to a sealed reactor including a reagent injection container, a cooling pipe, a nitrogen replacement device, a jacket heater, and a stirring device, and the liquid temperature inside the reactor was raised to 55° C. while replacing the air with nitrogen, and maintained for 30 minutes. Thereafter, a solution obtained by dissolving 0.15 parts of sodium pyrophosphate, 0.008 parts of iron (II) sulfate heptahydrate, and 0.3 parts of glucose in 8 parts of ion exchange water was added thereto. Next, a mixed solution of 15 parts of acrylonitrile, 40 parts of styrene, 5 parts of α-methylstyrene, 0.1 parts of cumene hydroperoxide, and 0.12 parts of tert-dodecyl mercaptan was added dropwise thereto for 4.5 hours to carry out polymerization. After the dropwise addition, the mixture was stirred for 30 minutes while maintaining the internal temperature at 55° C., and then cooled to obtain a latex of a graft copolymer. The obtained latex of the graft copolymer was diluted 1.25 times with distilled water, and was gradually added dropwise to a 3% sulfuric acid aqueous solution at 50° C. After the dropwise addition of the total amount, the temperature was raised to 90° C. and maintained for 5 minutes to be coagulated. Next, the coagulated product was centrifuged with a filter cloth, and the graft copolymer in a wet powdery state was dried to obtain a graft copolymer (A-6).

Synthesis Example 8: Graft Copolymer (A-7)

180 parts of water (including water in the latex of the rubber-based polymer (g-1)), 60 parts of the latex of the rubber-based polymer (g) in terms of solid content, and 0.18 parts of disproportionated potassium rosinate were added to a sealed reactor including a reagent injection container, a cooling pipe, a nitrogen replacement device, a jacket heater, and a stirring device, and the liquid temperature inside the reactor was raised to 55° C. while replacing the air with nitrogen, and maintained for 30 minutes. Thereafter, a solution obtained by dissolving 0.15 parts of sodium pyrophosphate, 0.008 parts of iron (II) sulfate heptahydrate, and 0.3 parts of glucose in 8 parts of ion exchange water was added thereto. Next, a mixed solution of 5 parts of acrylonitrile, 25 parts of styrene, 10 parts of α-methylstyrene, 0.1 parts of cumene hydroperoxide, and 0.12 parts of tert-dodecyl mercaptan was added dropwise thereto for 4.5 hours to carry out polymerization. After the dropwise addition, the mixture was stirred for 30 minutes while maintaining the internal temperature at 55° C., and then cooled to obtain a latex of a graft copolymer. The obtained latex of the graft copolymer was diluted 1.25 times with distilled water, and was gradually added dropwise to a 3% sulfuric acid aqueous solution at 50° C. After the dropwise addition of the total amount, the temperature was raised to 90° C. and maintained for 5 minutes to be coagulated. Next, the coagulated product was centrifuged with a filter cloth, and the graft copolymer in a wet powdery state was dried to obtain a graft copolymer (A-7).

Synthesis Example 9: Graft Copolymer (A-8)

180 parts of water (including water in the latex of the rubber-based polymer (g-1)), 60 parts of the latex of the rubber-based polymer (g) in terms of solid content, and 0.18 parts of disproportionated potassium rosinate were added to a sealed reactor including a reagent injection container, a cooling pipe, a nitrogen replacement device, a jacket heater, and a stirring device, and the liquid temperature inside the reactor was raised to 55° C. while replacing the air with nitrogen, and maintained for 30 minutes. Thereafter, a solution obtained by dissolving 0.15 parts of sodium pyrophosphate, 0.008 parts of iron (II) sulfate heptahydrate, and 0.3 parts of glucose in 8 parts of ion exchange water was added thereto. Next, a mixed solution of 10 parts of acrylonitrile, 30 parts of styrene, 0.1 parts of cumene hydroperoxide, and 0.12 parts of tert-dodecyl mercaptan was added dropwise thereto for 4.5 hours to carry out polymerization. After the dropwise addition, the mixture was stirred for 30 minutes while maintaining the internal temperature at 55° C., and then cooled to obtain a latex of a graft copolymer. The obtained latex of the graft copolymer was diluted 1.25 times with distilled water, and was gradually added dropwise to a 3% sulfuric acid aqueous solution at 50° C. After the dropwise addition of the total amount, the temperature was raised to 90° C. and maintained for 5 minutes to be coagulated. Next, the coagulated product was centrifuged with a filter cloth, and the graft copolymer in a wet powdery state was dried to obtain a graft copolymer (A-8).

[Production of Styrene-Based Copolymer (C)]

Synthesis Example 10: Acrylonitrile-Styrene Copolymer (C-1)

An acrylonitrile-styrene copolymer (C-1) consisting of 24.1 parts of acrylonitrile and 75.9 parts of styrene, and having a reduced viscosity of 0.49 dl/g, as measured at 25° C. in a N,N-dimethylformamide solution, was produced by a known suspension polymerization. A polystyrene-converted molecular weight Mw was 88,000.

Synthesis Example 11: Acrylonitrile-Styrene Copolymer (C-2)

An acrylonitrile-styrene copolymer (C-2) consisting of 26.7 parts of acrylonitrile and 73.3 parts of styrene, and having a reduced viscosity of 0.61 dl/g, as measured at 25° C. in a N,N-dimethylformamide solution, was produced by a known suspension polymerization. A polystyrene-converted molecular weight Mw was 106,000.

Synthesis Example 12: Styrene-Acrylonitrile-N-Phenylmaleimide Terpolymer (C-3)

A styrene-acrylonitrile-N-phenylmaleimide copolymer (C-3) consisting of 17.0 parts of acrylonitrile, 55.5 parts of styrene, and 28.5 parts of N-phenylmaleimide, and having a reduced viscosity of 0.67 dl/g, as measured at 25° C. in a N,N-dimethylformamide solution, was produced by a known continuous solution polymerization. A polystyrene-converted molecular weight Mw was 200,000.

[Polycarbonate Resin (P)]
The following resins were used as the polycarbonate resin (P).
Polycarbonate resin (P-1): "IUPILON S2000F" (viscosity-average molecular weight (Mv): 22,000) manufactured by Mitsubishi Engineering-Plastics Corporation
Polycarbonate resin (P-2): "IUPILON H3000F" (viscosity-average molecular weight (Mv): 18,000) manufactured by Mitsubishi Engineering-Plastics Corporation

[Polyester Resin (E)]
The following resin was used as the polyester resin (E).
Recycled PET resin (E-1): "UK-31" manufactured by UTSUMI RECYCLE SYSTEMS Examples 1 to 14 and Comparative Examples 1 to 5

The graft copolymer (A) and other thermoplastic resins were mixed at proportions (parts by mass) shown in Tables 2 to 5 to prepare a resin composition for plating. The obtained resin composition for plating was melt-kneaded at a temperature of 200° C. using a 30 mm twin-screw extruder ("TEX30α" manufactured by The Japan Steel Works, Ltd.), and pelletized to obtain pellets of the resin composition for plating. Using the resin composition for plating of each example, the plating appearance, the plating adhesion strength, and the cooling/heating cycle characteristics were evaluated. The results are shown in Tables 2 to 5. A blank in the table indicates that the component is not blended.

TABLE 1

| | Graft copolymer (A) | | Monomer component (a) three components | | | | | | | Monomer component (a) two components |
|---|---|---|---|---|---|---|---|---|---|---|
| | | | A-1 | A-2 | A-3 | A-4 | A-5 | A-6 | A-7 | A-8 |
| Rubber-based polymer (g-1) | | PBD | 60 | 60 | 60 | 60 | 60 | 40 | 60 | 60 |
| Monomer component (a) | Mixture (a1) of α-methylstyrene and aromatic vinyl compound other than α-methylstyrene | ST | 25 | 25 | 25 | 25 | 25 | 40 | 25 | 30 |
| | | αMS | 5 | 3 | 7 | 1 | 9 | 5 | 10 | 0 |
| | Vinyl cyanide compound (a2) | AN | 10 | 12 | 8 | 14 | 6 | 15 | 5 | 10 |
| Amount of mixture (a1) of α-methylstyrene and aromatic vinyl compound other than α-methylstyrene with respect to total mass of monomer component (a) (% by mass) | | | 75.0 | 70.0 | 80.0 | 65.0 | 85.0 | 75.0 | 87.5 | 75.0 |
| Amount of α-methylstyrene with respect to total mass of mixture (a1) of α-methylstyrene and aromatic vinyl compound other than α-methylstyrene (% by mass) | | | 16.7 | 10.7 | 21.9 | 3.8 | 26.5 | 11.1 | 28.6 | 0.0 |

TABLE 2

| | | | Example 1 | Example 2 | Example 3 | Example 4 | Example 5 |
|---|---|---|---|---|---|---|---|
| Graft copolymer (A) | | (A-1) | 25 | | | 25 | 25 |
| | | (A-2) | | 25 | | | |
| | | (A-3) | | | 25 | | |
| | | (A-4) | | | | | |
| | | (A-5) | | | | | |
| | | (A-6) | | | | | |
| | | (A-7) | | | | | |
| | | (A-8) | | | | | |
| Other thermoplastic resins | Styrene-based copolymer (C) | (C-1) | 25 | 25 | 25 | 25 | 35 |
| | | (C-2) | | | | | |
| | | (C-3) | | | | | |
| | Polycarbonate resin (P) | (P-1) | 50 | 50 | 50 | 45 | 40 |
| | | (P-2) | | | | | |
| | Polyester resin (E) | (E-1) | | | | 5 | |
| Rubber content of graft copolymer (A) | | % by mass | 60.0 | 60.0 | 60.0 | 60.0 | 60.0 |
| Rubber content of graft copolymer (A) with respect to total mass of resin composition for plating | | % by mass | 15.0 | 15.0 | 15.0 | 15.0 | 15.0 |
| Plating characteristics | Plating appearance | | A | A | A | A | A |
| | Evaluation | | 4 | 4 | 4 | 4 | 4 |

TABLE 2-continued

|  |  |  | Example 1 | Example 2 | Example 3 | Example 4 | Example 5 |
|---|---|---|---|---|---|---|---|
|  | Plating adhesion strength | N/cm | 15.4 | 15.3 | 15.2 | 15.2 | 15.2 |
|  |  |  | A | A | A | A | A |
|  | Evaluation |  | 4 | 4 | 4 | 4 | 4 |
| Cooling/heating cycle properties | Four cycles | 10 min | A | A | A | A | A |
|  |  | 20 min | A | A | A | A | A |
|  | Eight cycles | 10 min | A | A | A | A | A |
|  |  | 20 min | A | A | A | A | A |
|  | Evaluation (total of cooling/heating cycle properties) |  | 12 | 12 | 12 | 12 | 12 |
| Comprehensive determination |  |  | 20 ○ | 20 ○ | 20 ○ | 20 ○ | 20 ○ |

TABLE 3

|  |  |  | Example 6 | Example 7 | Example 8 | Example 9 | Example 10 |
|---|---|---|---|---|---|---|---|
| Graft copolymer (A) |  | (A-1) | 25 | 21 | 30 |  |  |
|  |  | (A-2) |  |  |  |  |  |
|  |  | (A-3) |  |  |  |  |  |
|  |  | (A-4) |  |  |  | 25 |  |
|  |  | (A-5) |  |  |  |  | 25 |
|  |  | (A-6) |  |  |  |  |  |
|  |  | (A-7) |  |  |  |  |  |
|  |  | (A-8) |  |  |  |  |  |
| Other thermoplastic resins | Styrene-based copolymer (C) | (C-1) | 5 | 39 | 30 | 25 | 25 |
|  |  | (C-2) |  |  |  |  |  |
|  |  | (C-3) |  |  |  |  |  |
|  | Polycarbonate resin (P) | (P-1) |  | 40 | 40 | 50 | 50 |
|  |  | (P-2) | 70 |  |  |  |  |
|  | Polyester resin (E) | (E-1) |  |  |  |  |  |
| Rubber content of graft copolymer (A) |  | % by mass | 60.0 | 60.0 | 60.0 | 60.0 | 60.0 |
| Rubber content of graft copolymer (A) with respect to total mass of resin composition for plating |  | % by mass | 15.0 | 12.6 | 18.0 | 15.0 | 15.0 |
| Plating characteristics | Plating appearance |  | A | A | A | B | B |
|  | Evaluation |  | 4 | 4 | 4 | 3 | 3 |
|  | Plating adhesion strength | N/cm | 16.1 | 15.1 | 15.7 | 13.7 | 14.3 |
|  |  |  | A | A | A | B | B |
|  | Evaluation |  | 4 | 4 | 4 | 3 | 3 |
| Cooling/heating cycle properties | Four cycles | 10 min | A | A | A | A | A |
|  |  | 20 min | A | A | A | A | A |
|  | Eight cycles | 10 min | A | A | A | A | A |
|  |  | 20 min | A | A | A | A | A |
|  | Evaluation (total of cooling/heating cycle properties) |  | 12 | 12 | 12 | 12 | 12 |
| Comprehensive determination |  |  | 20 ○ | 20 ○ | 20 ○ | 18 ○ | 18 ○ |

TABLE 4

|  |  |  | Example 11 | Example 12 | Example 13 | Example 14 |
|---|---|---|---|---|---|---|
| Graft copolymer (A) |  | (A-1) | 25 | 25 | 25 |  |
|  |  | (A-2) |  |  |  |  |
|  |  | (A-3) |  |  |  |  |
|  |  | (A-4) |  |  |  |  |
|  |  | (A-5) |  |  |  |  |
|  |  | (A-6) |  |  |  | 38 |
|  |  | (A-7) |  |  |  |  |
|  |  | (A-8) |  |  |  |  |
| Other thermoplastic resins | Styrene-based copolymer (C) | (C-1) |  |  |  | 22 |
|  |  | (C-2) | 75 | 60 | 30 |  |
|  |  | (C-3) |  | 15 | 45 |  |
|  | Polycarbonate resin (P) | (P-1) |  |  |  | 40 |
|  |  | (P-2) |  |  |  |  |
|  | Polyester resin (E) | (E-1) |  |  |  |  |
| Rubber content of graft copolymer (A) |  | % by mass | 60.0 | 60.0 | 60.0 | 40.0 |

TABLE 4-continued

|  |  |  | | Example 11 | Example 12 | Example 13 | Example 14 |
|---|---|---|---|---|---|---|---|
| Rubber content of graft copolymer (A) with respect to total mass of Resin composition for plating | | | % by mass | 15.0 | 15.0 | 15.0 | 15.2 |
| Plating characteristics | Plating appearance | | | A | A | A | C |
|  | Evaluation | | | 4 | 4 | 4 | 2 |
|  | Plating adhesion strength | | N/cm | 16.5 | 15.3 | 15.2 | 14 |
|  |  | | | A | A | A | B |
|  | Evaluation | | | 4 | 4 | 4 | 3 |
|  | Cooling/heating cycle properties | Four cycles | 10 min | A | A | A | B |
|  |  |  | 20 min | A | A | A | B |
|  |  | Eight cycles | 10 min | A | A | A | B |
|  |  |  | 20 min | A | A | A | B |
|  | | Evaluation (total of cooling/heating cycle properties) | | 12 | 12 | 12 | 8 |
| Comprehensive determination | | | | 20 | 20 | 20 | 13 |
|  | | | | ○ | ○ | ○ | ○ |

TABLE 5

|  |  |  | Comparative Example 1 | Comparative Example 2 | Comparative Example 3 | Comparative Example 4 | Comparative Example 5 |
|---|---|---|---|---|---|---|---|
| Graft copolymer (A) | | (A-1) | | | | 15 | 34 |
|  | | (A-2) | | | | | |
|  | | (A-3) | | | | | |
|  | | (A-4) | | | | | |
|  | | (A-5) | | | | | |
|  | | (A-6) | | | | | |
|  | | (A-7) | | | 25 | | |
|  | | (A-8) | 25 | 25 | | | |
| Other thermoplastic resins | Styrene-based copolymer (C) | (C-1) | 25 | | 25 | 15 | 26 |
|  |  | (C-2) | | 75 | | | |
|  |  | (C-3) | | | | | |
|  | Polycarbonate resin (P) | (P-1) | 50 | | 50 | | 40 |
|  |  | (P-2) | | | | 70 | |
|  | Polyester resin (E) | (E-1) | | | | | |
| Rubber content of graft copolymer (A) | | % by mass | 60.0 | 60.0 | 60.0 | 60.0 | 60.0 |
| Rubber content of graft copolymer (A) with respect to total mass of resin composition for plating | | % by mass | 15.0 | 15.0 | 15.0 | 9.0 | 20.4 |
| Plating characteristics | Plating appearance | | D | D | C | A | A |
|  | Evaluation | | 1 | 1 | 2 | 4 | 4 |
|  | Plating adhesion strength | N/cm | 15.4 | 16.3 | 7.8 | 7.4 | 15.8 |
|  |  | | B | B | D | D | A |
|  | Evaluation | | 3 | 3 | 1 | 1 | 4 |
|  | Cooling/ heating cycle properties | Four cycles | 10 min | A | A | B | A | C |
|  |  |  | 20 min | A | A | B | A | C |
|  |  | Eight cycles | 10 min | A | A | B | A | C |
|  |  |  | 20 min | A | A | B | A | C |
|  | | Evaluation (total of cooling/heating cycle properties) | 12 | 12 | 8 | 12 | 4 |
| Comprehensive determination | | | 16 | 16 | 11 | 17 | 12 |
|  | | | X | X | X | X | X |

Table 1 summarizes the amount of styrene with respect to the total mass of the monomer component (a) in the graft copolymers (A-1) to (A-6) of Examples.

In the following, "ST" means styrene, "αMS" means α-methylstyrene, "AN" means acrylonitrile, and "part" means part by mass.

The amount of ST in the graft copolymer (A-1) with respect to the total mass of the monomer component (a) was 62.5% by mass. The basis thereof is a total of 40 parts of the monomer component (a), 25 parts of ST, 5 parts of αMS, and 10 parts of AN.

The amount of ST in the graft copolymer (A-2) with respect to the total mass of the monomer component (a) was 62.5% by mass. The basis thereof is a total of 40 parts of the monomer component (a), 25 parts of ST, 3 parts of αMS, and 12 parts of AN.

The amount of ST in the graft copolymer (A-3) with respect to the total mass of the monomer component (a) was 62.5% by mass. The basis thereof is a total of 40 parts of the monomer component (a), 25 parts of ST, 7 parts of αMS, and 8 parts of AN.

The amount of ST in the graft copolymer (A-4) with respect to the total mass of the monomer component (a) was 62.5% by mass. The basis thereof is a total of 40 parts of the monomer component (a), 25 parts of ST, 1 part of αMS, and 14 parts of AN.

The amount of ST in the graft copolymer (A-5) with respect to the total mass of the monomer component (a) was 62.5% by mass. The basis thereof is a total of 40 parts of the monomer component (a), 25 parts of ST, 9 parts of αMS, and 6 parts of AN.

The amount of ST in the graft copolymer (A-6) with respect to the total mass of the monomer component (a) was 66.7% by mass. The basis thereof is a total of 60 parts of the monomer component (a), 40 parts of ST, 5 parts of αMS, and 15 parts of AN.

That is, in Table 1, the amount of ST in each of the graft copolymers (A-1) to (A-6) related to Examples with respect to the total mass of the monomer component (a) is in a range of 62.5% to 66.7% by mass.

That is, in Table 1, the amount of αMS in each of the graft copolymers (A-1) to (A-6) related to Examples with respect to the total mass of the monomer component (a) is in a range of 2.5% to 25.0% by mass.

That is, in Table 1, the amount of AN in each of the graft copolymers (A-1) to (A-6) related to Examples with respect to the total mass of the monomer component (a) is in a range of 15.0% to 35.0% by mass.

The plated product obtained by performing a plating treatment on the molded article (test piece) of the resin composition for plating of each of Examples had no defects in appearance due to minute irregularities on the surface of the plated product, and had an excellent plating appearance. In addition, the plating adhesion strength was high, the cooling/heating cycle characteristics were excellent, and the plating characteristics were favorable.

With respect to Examples, in a case of Comparative Example 3 in which the graft copolymer (A-7) in which the amount of α-methylstyrene in the mixture (a1) of α-methylstyrene and the aromatic vinyl compound other than α-methylstyrene as the monomer component (a) of the graft copolymer (A) was excessive was used, the plating appearance and the cooling/heating cycle characteristics were at a practically acceptable level, but the plating adhesion strength was deteriorated.

In Comparative Examples 1 and 2 in which the graft copolymer (A-8) not containing α-methylstyrene in the monomer component (a) of the graft copolymer (A) was used, the plating appearance was deteriorated. In Comparative Example 4 in which the rubber content of the resin composition for plating was lower than the specified amount, the plating adhesion strength was deteriorated. In Comparative Example 5 in which the rubber content of the resin composition for plating was higher than the specified amount, favorable cooling/heating cycle properties were not obtained.

INDUSTRIAL APPLICABILITY

According to the present invention, it is possible to provide a resin composition for plating, with which a plated product having excellent plating characteristics can be obtained, and the present invention is extremely important in the industry.

What is claimed is:

1. A graft copolymer (A) obtained by graft-polymerizing a monomer component (a) to a rubber-based polymer,
    wherein the monomer component (a) satisfies both Requirements 1 and 2, and
    a rubber content of the graft copolymer (A) is 40% by mass or more with respect to a total mass of the graft copolymer (A),
    Requirement 1—the monomer component (a) contains 60% by mass or more and 85% by mass or less of a mixture (a1) of α-methylstyrene and styrene with respect to a total mass of the monomer component (a),
    Requirement 2—the monomer component (a) contains 62.5% by mass or more and 66.7% by mass or less of styrene with respect to a total mass of the monomer component (a).

2. The graft copolymer according to claim 1,
    wherein, in addition to Requirements 1 and 2, the monomer component (a) further satisfies Requirement 3,
    Requirement 3—an amount of the α-methylstyrene in the mixture (a1) is more than 0% by mass and less than 28.6% by mass with respect to a total mass of the mixture (a1).

3. A resin composition for plating, comprising:
    the graft copolymer according to claim 1 or 2, and a thermoplastic resin other than the graft copolymer according to claim 1 or 2,
    wherein a rubber content of the resin composition for plating is 10% to 18% by mass with respect to a total mass of the resin composition for plating.

4. A molded article obtained by molding the resin composition for plating according to claim 3.

5. A plated product comprising:
    the molded article according to claim 4; and
    a plating film provided on at least a part of a surface of the molded article.

6. The graft copolymer according to claim 1,
    wherein, the rubber content of the graft copolymer (A) is 40% by mass to 75% by mass with respect to the total mass of the graft copolymer (A).

7. The graft copolymer according to claim 1,
    wherein, the rubber content of the graft copolymer (A) is 50% by mass to 70% by mass with respect to the total mass of the graft copolymer (A).

8. The graft copolymer according to claim 1,
    wherein, in addition to Requirements 1 and 2, the monomer component (a) further satisfies Requirement 4,
    Requirement 4—an amount of the α-methylstyrene in the mixture (a1) is 3.8% by mass or more and 26.5% by mass or less with respect to a total mass of the mixture (a1).

9. The graft copolymer according to claim 1,
    wherein, in addition to Requirements 1 and 2, the monomer component (a) further satisfies Requirement 5,
    Requirement 5—an amount of the α-methylstyrene in the mixture (a1) is 10.7% by mass or more and 21.9% by mass or less with respect to a total mass of the mixture (a1).

* * * * *